(12) United States Patent
Conny

(10) Patent No.: US 10,829,025 B2
(45) Date of Patent: Nov. 10, 2020

(54) DUMP BODY WITH INCLUDED ACCESS DOOR

(71) Applicant: Mac Trailer Manufacturing, Inc., Alliance, OH (US)

(72) Inventor: Michael A. Conny, Beloit, OH (US)

(73) Assignee: Mac Trailer Manufacturing, Inc., Alliance, OH (US)

( * ) Notice: Subject to any disclaimer, the term of this patent is extended or adjusted under 35 U.S.C. 154(b) by 165 days.

(21) Appl. No.: 15/960,635

(22) Filed: Apr. 24, 2018

(65) Prior Publication Data
US 2019/0217764 A1  Jul. 18, 2019

Related U.S. Application Data

(60) Provisional application No. 62/617,330, filed on Jan. 15, 2018.

(51) Int. Cl.
*B60P 1/28* (2006.01)
*B60P 1/16* (2006.01)

(52) U.S. Cl.
CPC .............. *B60P 1/28* (2013.01); *B60P 1/16* (2013.01); *B60P 1/283* (2013.01)

(58) Field of Classification Search
CPC ..... B60P 1/28; B60P 1/16; B60P 1/283; B60J 5/0497; B60R 1/06
USPC ....... 298/17 R, 22 R, 22 P; 296/183.2, 146.8
See application file for complete search history.

(56) References Cited

U.S. PATENT DOCUMENTS

| | | | | |
|---|---|---|---|---|
| 2,832,483 A | * | 4/1958 | Jones | B65F 1/02 414/539 |
| 2,995,399 A | * | 8/1961 | Riseborough | B60P 1/06 298/22 R |
| 3,100,918 A | * | 8/1963 | Coverley | E06B 7/2318 49/477.1 |
| 3,747,275 A | * | 7/1973 | May | B61D 19/001 49/477.1 |
| 5,078,567 A | * | 1/1992 | Lombardo | B65F 3/001 298/17 R |
| 9,102,466 B2 | * | 8/2015 | Neufeldt | B65F 3/08 |
| 2019/0149814 A1 | * | 5/2019 | Friend | H04N 17/002 348/187 |

* cited by examiner

Primary Examiner — Stephen T Gordon
(74) Attorney, Agent, or Firm — Sand, Sebolt & Wernow Co., LPA

(57) ABSTRACT

A dump body apparatus including a dump body having an exterior wall defining a compartment for carrying a load. The exterior wall includes a front wall and first and second sidewalls. A first corner wall extends between the front wall and the first sidewall. The first corner wall is oriented at an obtuse angle relative to one or both of the front wall and the first sidewall. An opening is defined in the first corner wall and is in communication with the compartment. A door selectively closes off access to the compartment and a step may be provided below the door. An angled second corner wall may be provided between the front wall and the second sidewall. The angles of the first and second corner walls provide relatively unobstructed lines of sight for a driver seated in a cab of a vehicle that includes the dump body.

20 Claims, 8 Drawing Sheets

DUMP BODY WITH INCLUDED ACCESS DOOR

CROSS REFERENCE TO RELATED APPLICATIONS

This application claims the benefit of U.S. Provisional Application Ser. No. 62/617,330, filed on Jan. 15, 2018; the disclosure of which is incorporated herein by reference.

BACKGROUND

Technical Field

The present disclosure relates generally to trucks. More particularly, the present disclosure relates to dump trucks. Specifically, the present disclosure is directed to a dump body for a dump body that includes at least one mitered front corner having an access door defined therein and which provides access for a person into an interior of the dump body.

BACKGROUND INFORMATION

Operators of trucks and trailers often have to enter the truck bed or trailer to perform various tasks. One exemplary task that an operator may perform is the cleaning of the truck bed or trailer after delivering a load. For dump trucks, in particular, in order to perform this task, the operator may ascend a ladder to enter the inside of the dump body by traveling over a top of the dump bed's sidewall. Alternatively, the operator may prop open the rear tailgate so that they may enter into and out of the interior of the dump body. Having to climb over the top of the sidewall or propping open the tailgate may present a risk of injury to the operator. The operator may lose his or her balance while ascending the ladder or while traveling down the other side of the sidewall. There may also be a risk of injury to the operator should the rear tailgate return to a closed position while the operator is attempting to get into or out of the interior of the towed vehicle.

SUMMARY

The inventor has recognized that it is possible to provide a dump body that provides a safer and easier way for truck operators or drivers to enter and exit the interior of the dump body of a dump truck.

The dump body disclosed herein also provides improved lines of sight for the operator when driving or backing up the dump truck. Prior art dump trucks typically include two side-view mirrors, each of which provides a line of sight for the driver to see objects and vehicles located behind the dump truck. The line of sight from each mirror is typically partially obstructed by part of the front wall of the dump body. The dump body disclosed herein, which has at least one and preferably two mitered (i.e., angled) corner walls, provides much improved lines of sight for the driver from an associated one of the side mirrors of the vehicle.

A dump body is disclosed herein that includes a front wall having a first side and a second side, a first sidewall having a first side and a first wall interposed between the first side of the front wall and the first side of the first sidewall. The first wall may comprise a mitered corner that is disposed at an obtuse angle relative to the front wall and to the sidewall. The angled corner wall may be substantially flat from a first region where the corner wall joins the front wall to a second region where the corner wall joins a sidewall of the dump truck.

A dump body apparatus (such as a dump truck) is disclosed that includes a dump body having an exterior wall defining a compartment for carrying a load. The exterior wall includes a front wall and first and second sidewalls. A first corner wall extends between the front wall and the first sidewall. The first corner wall is oriented at an obtuse angle relative to one or both of the front wall and the first sidewall. An opening is defined in the first corner wall and is in communication with the compartment. A door selectively closes off access to the compartment and a step may be provided below the door. An angled second corner wall may be provided between the front wall and the second sidewall. The angles of the first and second corner walls provide relatively unobstructed lines of sight for a driver seated in a cab of a vehicle that includes the dump body.

In one aspect, the present disclosure may provide a dump body apparatus comprising a dump body adapted to form part of a dump truck, said dump body comprising an exterior wall including a bottom wall, a front wall, a pair of opposed sidewalls and a corner wall extending between the front wall and one of the pair of sidewalls; a compartment bounded and defined by the exterior wall and adapted to carry a load; an opening defined in the corner wall; wherein the opening is in communication with the compartment; and a door that is movable between a closed position and an open position; wherein when the door is in the open position the compartment is accessible through the opening. The opening is of a size suitable to receive a person therethrough.

In another aspect, the present disclosure may provide that the exterior wall may further include a bottom wall, a sidewall extending upwardly from the bottom wall and a corner wall extending upwardly from the bottom wall and forwardly from the sidewall. The corner wall may be disposed at an obtuse angle relative to the one of the pair of sidewalls. The opening may be defined in the corner wall.

In another aspect, the present disclosure may provide that the exterior wall may further comprise a bottom wall, a front wall extending upwardly from the bottom wall, a sidewall extending upwardly from the bottom wall and a corner wall extending between the front wall and the sidewall. The corner wall may be disposed at an obtuse angle relative to one of or both of the front wall and the sidewall. The opening may be defined in the corner wall. A step and a platform may be operatively engaged with a towing vehicle or the dump body adjacent the first wall.

In another aspect, the present disclosure may provide a dump body comprising a front wall having a first side and a second side; a first sidewall having a first side; and a first wall interposed between the first side of the front wall and the first side of the first sidewall; wherein the first wall is oriented at an angle relative to the front wall and first sidewall. The first wall may be disposed at an obtuse angle relative to one of or both of the front wall and the first sidewall. The dump body may further comprise a towing vehicle including a cab with a first side-view mirror provided on the cab; said first side-view mirror providing a driver seated in the cab with a first line of sight adjacent the first wall of the dump body; and wherein the first line of sight is unobstructed by the front wall.

In another aspect, the present disclosure may provide a dump body with a second sidewall having a first side; a second wall interposed between the second side of the front wall and the first side of the second sidewall; wherein the second wall is oriented at an obtuse angle relative to the front wall and second sidewall. A cab of a towing vehicle engaged with the dump body may further include a second side-view mirror provided on the cab, said second side-view mirror providing the driver seated in the cab with a second line of sight adjacent the second wall of the dump body; and wherein the second line of sight is unobstructed by the front wall.

The present disclosure offers a dump body apparatus for providing safer and easier ingress into and egress from the interior of a compartment of the dump body through a door provided in a corner wall proximate the front end of the dump body. The present disclosure further provides a dump body for a dump truck with relatively improved lines of sight for a driver seated in a cab of a vehicle towing the dump body or otherwise engaged with a frame that supports the dump body.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

A dump body apparatus is generally indicated as 10, and is shown in FIG. 1-FIG. 8. Dump body apparatus 10 may form part of a standard dump truck 12. In other instances, dump body apparatus 10 may form part of a trailer that is towed behind a towing vehicle.

Figure 1:
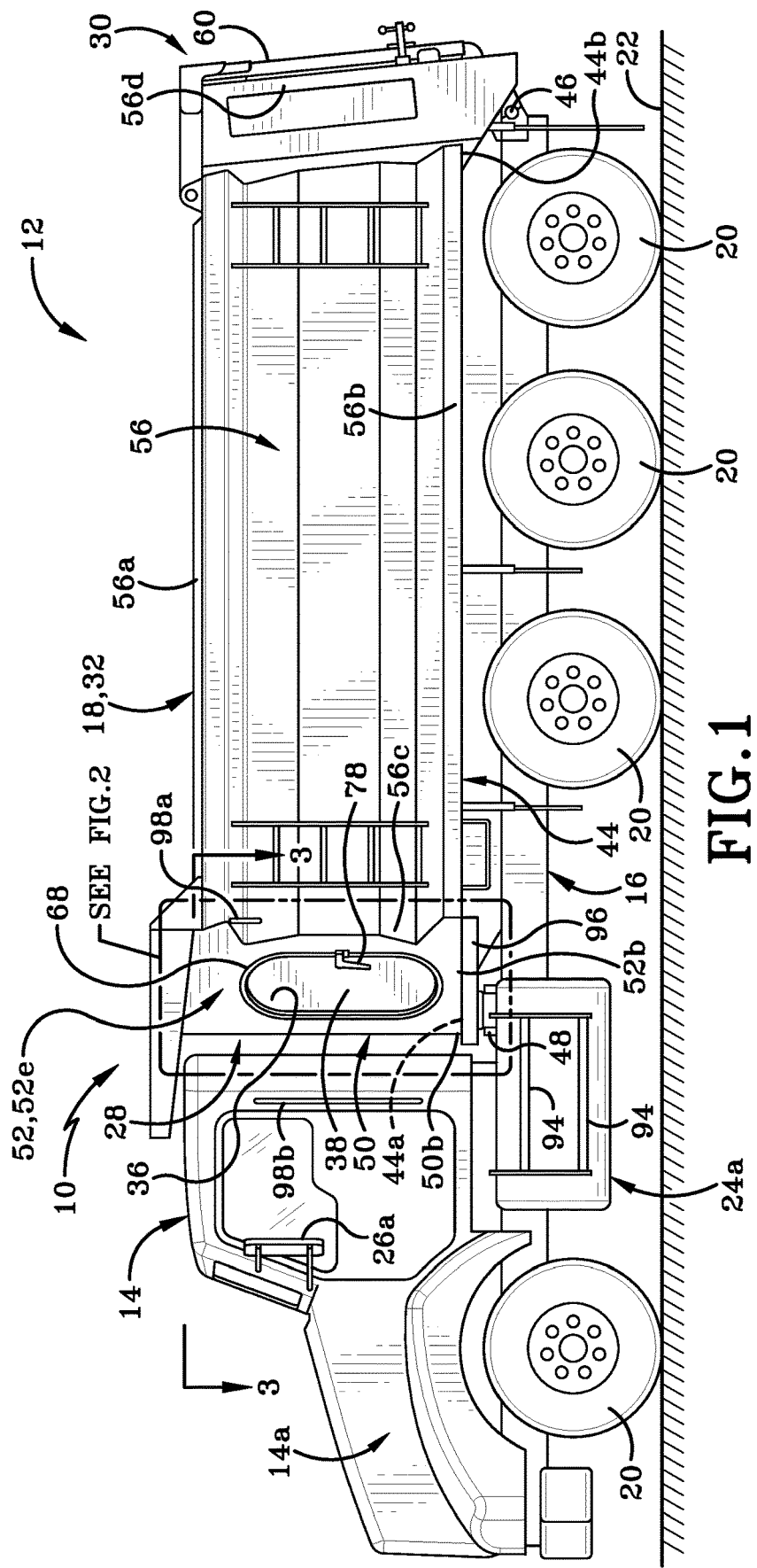
FIG. 1 is a side elevational view of a dump truck including a door mounted in the corner wall.
Figure 3:
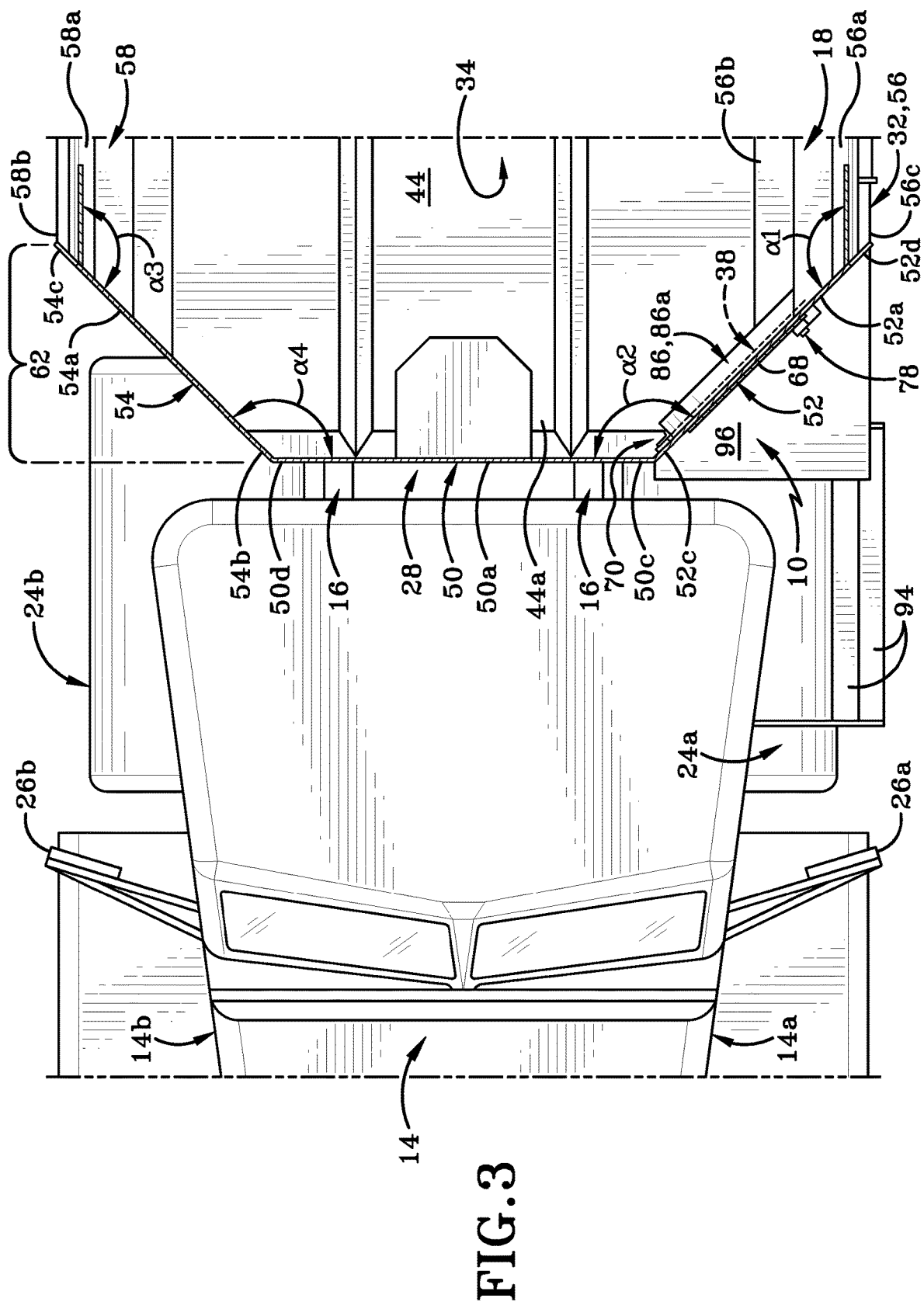
FIG. 3 is an enlarged top plan view taken along line 3-3 of FIG. 1 showing the rear portion of the cab and the front portion of the dump body with parts removed for clarity.

As shown in FIG. 1, dump truck 12 may comprise a cab 14 mounted on a front region of a truck frame 16, and an open box dump body 18 mounted on a rear region of the truck frame 16. Dump body 18 is designed to carry a load (not shown) therein. Dump truck 12 may further include a plurality of wheels 20 mounted on frame 16 and positioned to contact a road surface 22 over which the truck 12 may travel. Dump truck 12 may further include a first fuel tank 24a and a second fuel tank 24b mounted on truck frame 16 (FIG. 3). Dump truck 12 may further include a first side-view mirror 26a and a second side-view mirror 26b provided on cab 14 (FIG. 3). Each side-view mirror 26a, 26b may provide a line of sight for the driver/operator when seated in cab 14 so that the driver may see objects or vehicles behind dump body 18.

As shown in FIG. 1, dump body 18 may include a front end 28 spaced forwardly from a rear end 30. Front end 28 and rear end 30 may define a longitudinal direction therebetween.

As shown in FIG. 1, FIG. 3, FIG. 5-FIG. 6 and FIG. 8, dump body 18 may include an exterior wall 32 that defines a compartment 34 within which a load may be carried. Exterior wall 32 may include a bottom wall 44 having a front end 44a and a rear end 44b. Rear end 44b of bottom wall 44 may be pivotally secured to frame 16 by a hinge 46. A hydraulic lifting assembly 48 may be mounted on frame 16 and engaged with dump body 18 such that bottom wall 44 may pivot about hinge 46 and become oriented at an angle relative to frame 16. Lifting assembly 48 may be, in particular, operatively engaged with a front end of dump body 18 and be movable between a first position and a second position. The front end of dump body 18 may be raised at angle relative to a rear end of the dump body 18 when lifting assembly 48 is in the first position; and the front end of the dump body 18 may be horizontally aligned with the rear end of the dump body 18 when the lifting assembly 48 is in the second position. The lifting assembly 48 is shown in the second position in FIG. 1.

A shown in FIG. 1 and FIG. 3, exterior wall 32 may further include a front wall 50 proximate front end 28 of dump body 18, a first wall 52 proximate front end 28 of dump body 18, a second wall 54 proximate front end 28 of dump body 18, a first sidewall 56 extending longitudinally between front end 28 and rear end 30 of dump body 18, a second sidewall 58 (FIG. 3) spaced apart from first sidewall 56 and extending longitudinally between front end 28 and rear end 30 of dump body. First wall 52 and second wall 54 may comprise corner walls that extend between front wall 50 and a respective one of the first and second sidewalls 56, 58. Each of the front wall 50, first wall 52, second wall 54, first sidewall 56 and second sidewall 58 may extend upwardly from bottom wall 44. Furthermore, each of front wall 50, first wall 52, second wall 54, first sidewall 56 and second sidewall 58 may extend upwardly generally at right angles to bottom wall 44. A tailgate 60 may be provided proximate rear end 30 of dump body 18. Tailgate 60 may be moved to an open position when a load is to be dumped from dump body 18. Tailgate 60 may move to the open position when hydraulic lifting assembly 48 raises the front end of dump body 18. Tailgate 60 may move to the closed position when hydraulic lifting assembly 48 lowers the front end 28 of the dump body 18 once again.

With continued reference to FIG. 1, first sidewall 56 and second sidewall 58 may define a transverse direction therebetween. Front wall 50 may define a first plane, and, as shown in FIG. 1, front wall 50 may extend transversely between first wall 52 and second wall 54 in a straight line within first plane. First wall 52 may define a second plane, and, as shown in FIG. 1, first wall 52 may extend between front wall 50 and first sidewall 56 in a straight line within the second plane. First sidewall 56 may define a third plane, and, as shown in FIG. 1, first sidewall 56 may extend between first wall 56 and tailgate 60 in a straight line within the third plane. Tailgate 60 may engage rear ends of first sidewall 56 and second sidewall 58 and may extend transversely between first sidewall 56 and second sidewall 58.

In accordance with an aspect of the present invention and as shown in FIG. 3, first wall 52 may be a mitered corner that extends between front wall 50 and first sidewall 56. First wall 52 may connect to first sidewall 56 at an obtuse angle α1. Angle α1 may be an angle that is from about 100 degrees up to about 150 degrees and preferably is about 135 degrees. However, it will be understood that that angle α1 may be any angle greater than 90 degrees and less than 180 degrees. First wall 52 may connect with front wall 50 at an obtuse angle α2. Angle α2 may be an angle that is from about 100 degrees up to about 150 degrees and preferably is about 135 degrees. However, it will be understood that that angle α2 may be any angle greater than 90 degrees and less than 180 degrees. In other words, first wall 52 may join front wall 50 with first sidewall 56 where first wall 52 is disposed at an obtuse angle relative to front wall 50 and first sidewall 56 respectively.

In accordance with another aspect of the disclosure, dump body 18 may be provided with a mitered second wall 54. As shown in FIG. 3, second wall 54 may connect with second sidewall 58 at an obtuse angle α3. Angle α3 may be an angle that is from about 100 degrees up to about 150 degrees and preferably is about 135 degrees. However, it will be understood that that angle α3 may be any angle greater than 90 degrees and less than 180 degrees. Second wall 58 may connect with front wall 50 at an obtuse angle α4. Angle α4 may be an angle that is from about 100 degrees up to about 150 degrees and preferably is about 135 degrees. However, it will be understood that that angle α4 may be any angle greater than 90 degrees and less than 180 degrees. In other words, second wall 54 may join front wall 50 with second sidewall 58 where second wall 54 is disposed at an obtuse angle relative to front wall 50 and second sidewall 58 respectively.

Because of the mitered corners or angles of first and second walls 52, 54; front wall 50, first wall 52 and second wall 54 may form a trapezoidal end portion 62 of dump body 18 when viewed from above. First sidewall 56, second sidewall 58 and tailgate 60 may form a rectangular end portion (not shown) of dump body 18 when viewed from above. As indicated earlier herein, bottom wall 44, front wall 50, first wall 52, second wall 54, first sidewall 56, second sidewall 58 and tailgate 60 may bound and define compartment 34.

As shown in FIG. 1 and FIG. 3, front wall 50 may include a top end 50a, a bottom end 50b, a first side 50c and a second side 50d. First wall 52 may include a top end 52a, a bottom end 52b, a first side 52c and a second side 52d. Second wall 54 may include a top end 54a, a bottom end (not shown), a first side 54b and a second side 54c. First sidewall 56 may include a top end 56a, a bottom end 56b, a first side 56c and a second side 56d. Second sidewall 58 may include a top end 58a, a bottom end (not shown), a first side 58b and a second side (not shown). As shown in FIG. 1, top end 56a of first sidewall 56 and bottom end 56b of first sidewall 56 may define a vertical direction therebetween.

In accordance with another aspect of the present disclosure, exterior wall 32 of dump body 18 may define a wall opening 55 extending therethrough that is in communication with compartment 34. Wall opening 55 is illustrated in the attached figures as being defined in first wall 52 but it will be understood that wall opening 55 may instead be defined in second wall 54.

Wall opening 55 may be of a size suitable to allow a person to move therethrough and into compartment 34. Wall opening 55 may define an edge 53 around which a seal 68 is placed. Seal 68 thus circumscribes opening 55 and may be complementary in shape to wall opening 55 and may define a door opening 36. A door 38 may be provided to selectively close off access to door opening 36. Door 38 may be movable between closed position 40 and an open position 42. When door 38 is in open position 42, compartment 34 may be accessed by an operator (not shown) for, inter alia, cleaning, inspection and repair of compartment 34 of dump body 18. When door 38 is in the closed position 40, seal 68 aids in preventing airflow into compartment 34 and further aids in preventing any of the load from exiting compartment 34 through opening 55.

Figure 8:
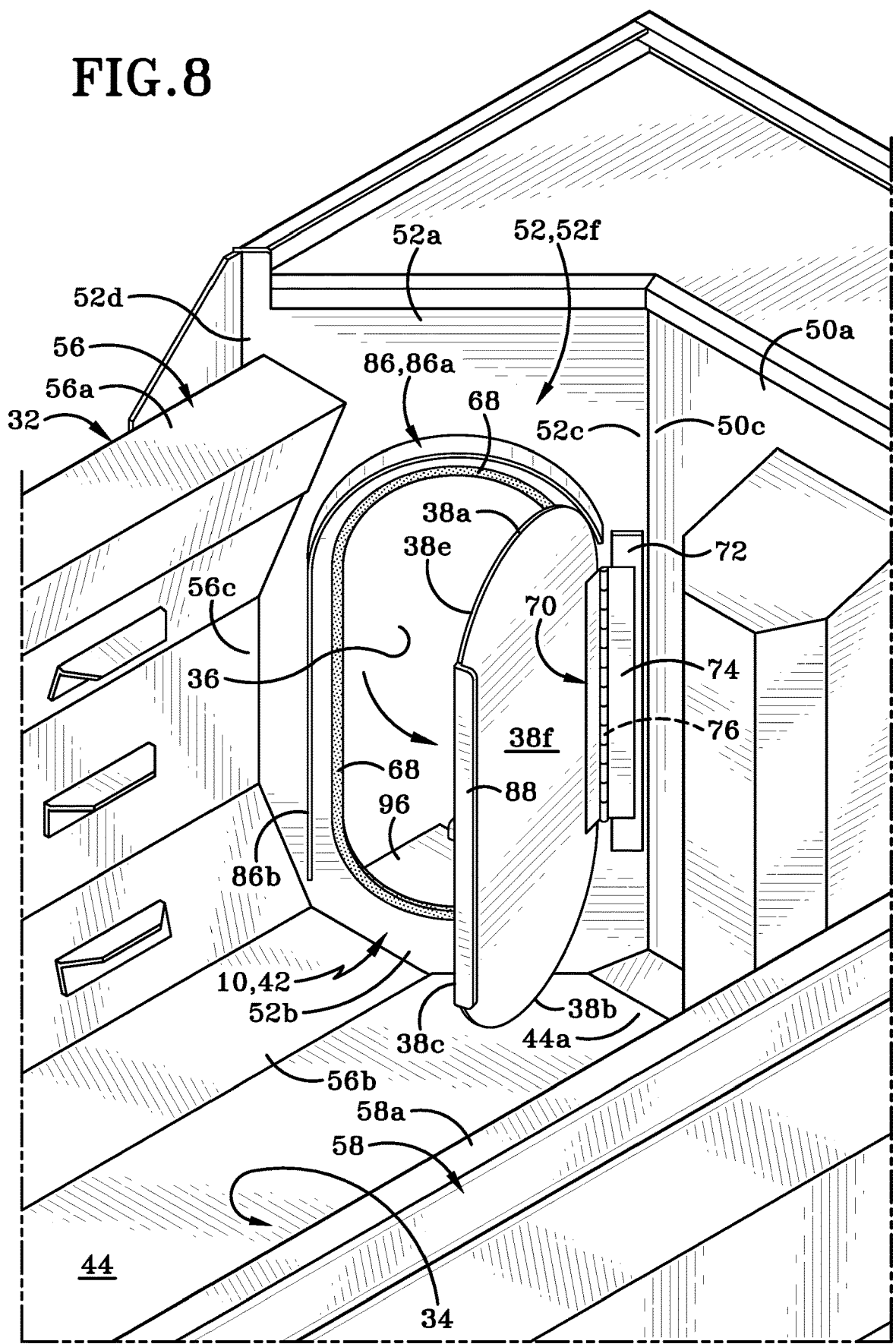
FIG. 8 is a rear perspective view of the door with the door in a partially opened position.

As shown in FIG. 1-FIG. 2, FIG. 6 and FIG. 8, wall opening 55, and therefore door 38, may be generally oval in shape. Door 38 may include an arcuate top end 38a, an arcuate bottom end 38b a first side 38c, a second side 38d, an outer surface 38e and an inner surface 38f. (It will be understood that wall opening 55, and therefore door 38, may be of any other desired shape.) A hinge assembly 70 may be provided to engage door 38 to first wall 52 or to a region of front wall 50 or first sidewall 56. Hinge assembly 70 may be configured to move door 38 between closed and open positions 40, 42. For example, and as shown in FIG. 8, hinge assembly 70 may include a mounting block 72, a hinge mechanism 74 and a hinge pin 76. Mounting block 72 may be mounted to inner surface 52f proximate first side 52c of first wall 52 and proximate door opening 36 in any suitable manner. Hinge mechanism 74 may be adapted to be mounted to mounting block 72 and door 38 in any suitable manner, such as by fasteners or adhesives (not shown). Hinge pin 76 may be disposed within hinge mechanism 74 in any suitable manner. Hinge pin 76 defines a first pivot axis X1 about which door 38 pivots from closed position 40 to open position 42 and from open position 42 to closed position 40.

Figure 2:
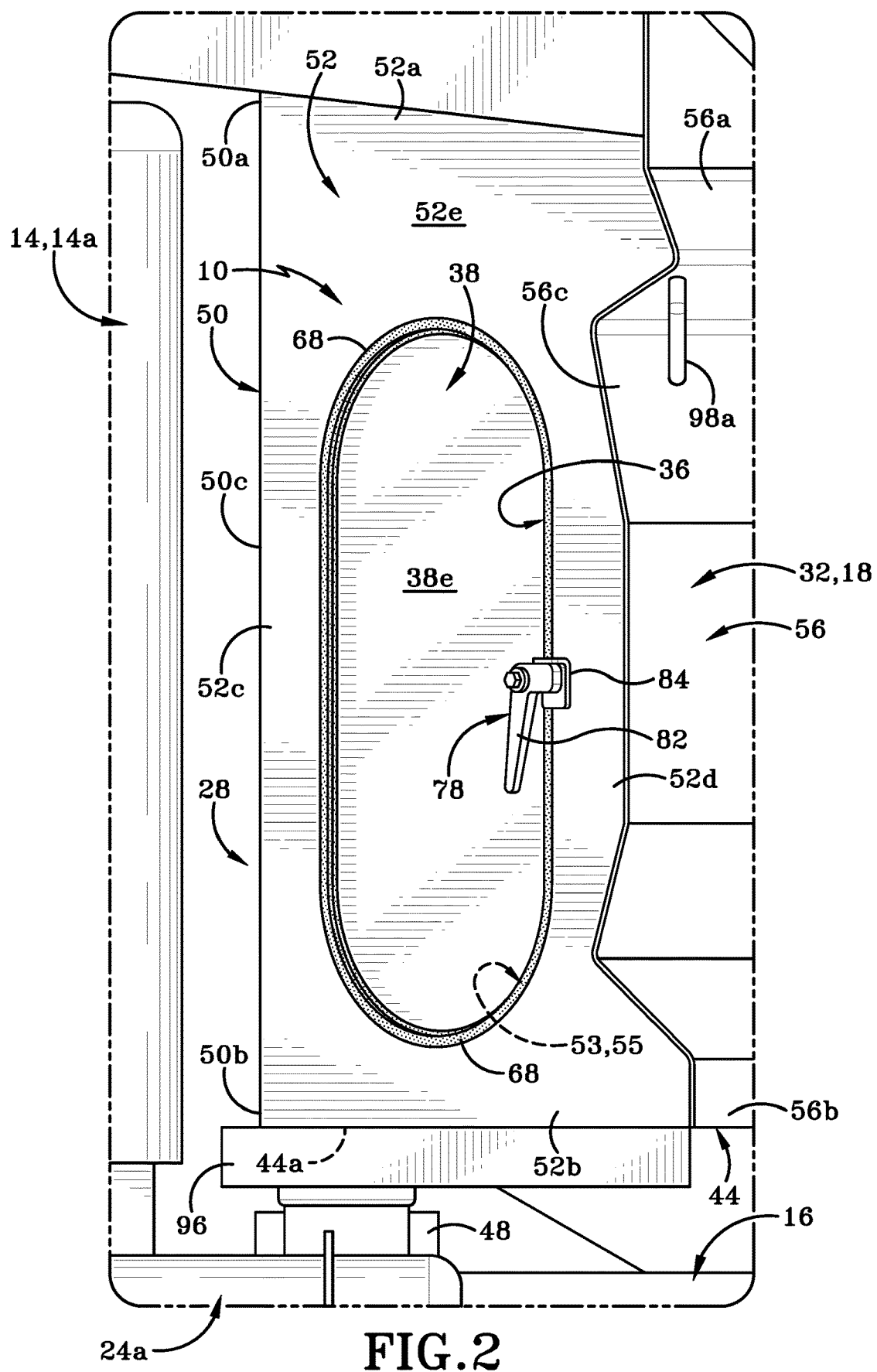
FIG. 2 is an enlarged side elevational view taken of the door taken from the cutout in FIG. 1.
Figure 7:
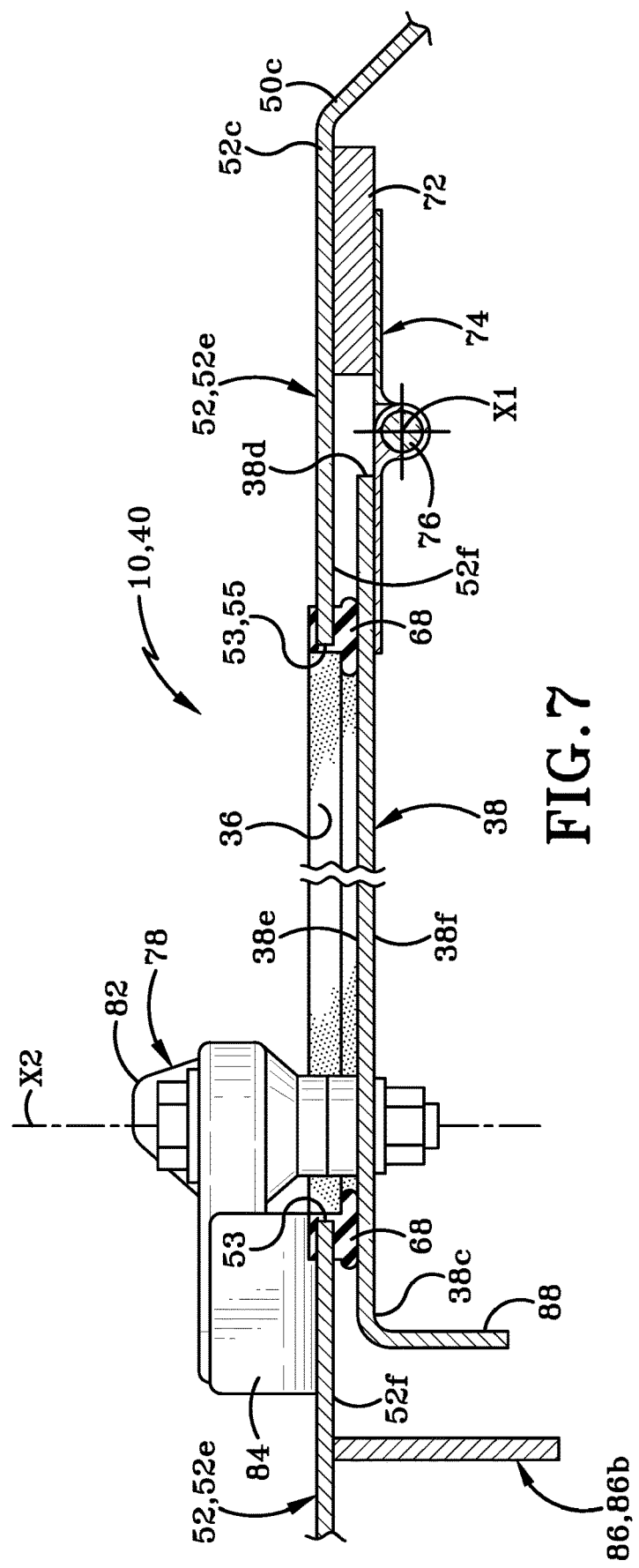
FIG. 7 is a partial top cross sectional view taken along line 7-7 of FIG. 6 of the door in the closed position and a portion of the side of the door.

As shown in FIG. 1-FIG. 2 and FIG. 7, door 38 may further include a handle assembly 78 movable between an engaged position and a disengaged position. Handle assembly 78 may be configured to open and close door 38 in any suitable manner. As shown in FIG. 1 and FIG. 7, handle assembly 78 may include a handle 82 operatively engaged with a support member 84. Support member 84 may be operatively engaged with door 38 proximate second side 38d of door 38. Handle 82 may be pivotable about a second pivot axis X2 when moving from engaged position to disengaged position. When handle 82 is in disengaged position, door 38 is movable from closed position 40 to open position 42 and from open position 42 to closed position 40. Door 38 may further include a door flange 88 adjacent first side 38c of door 38. Door flange 88 extends inwardly into compartment 34. Door flange 88 may be used by an operator to move door 38 to the open or closed position when inside compartment 34.

Figure 6:
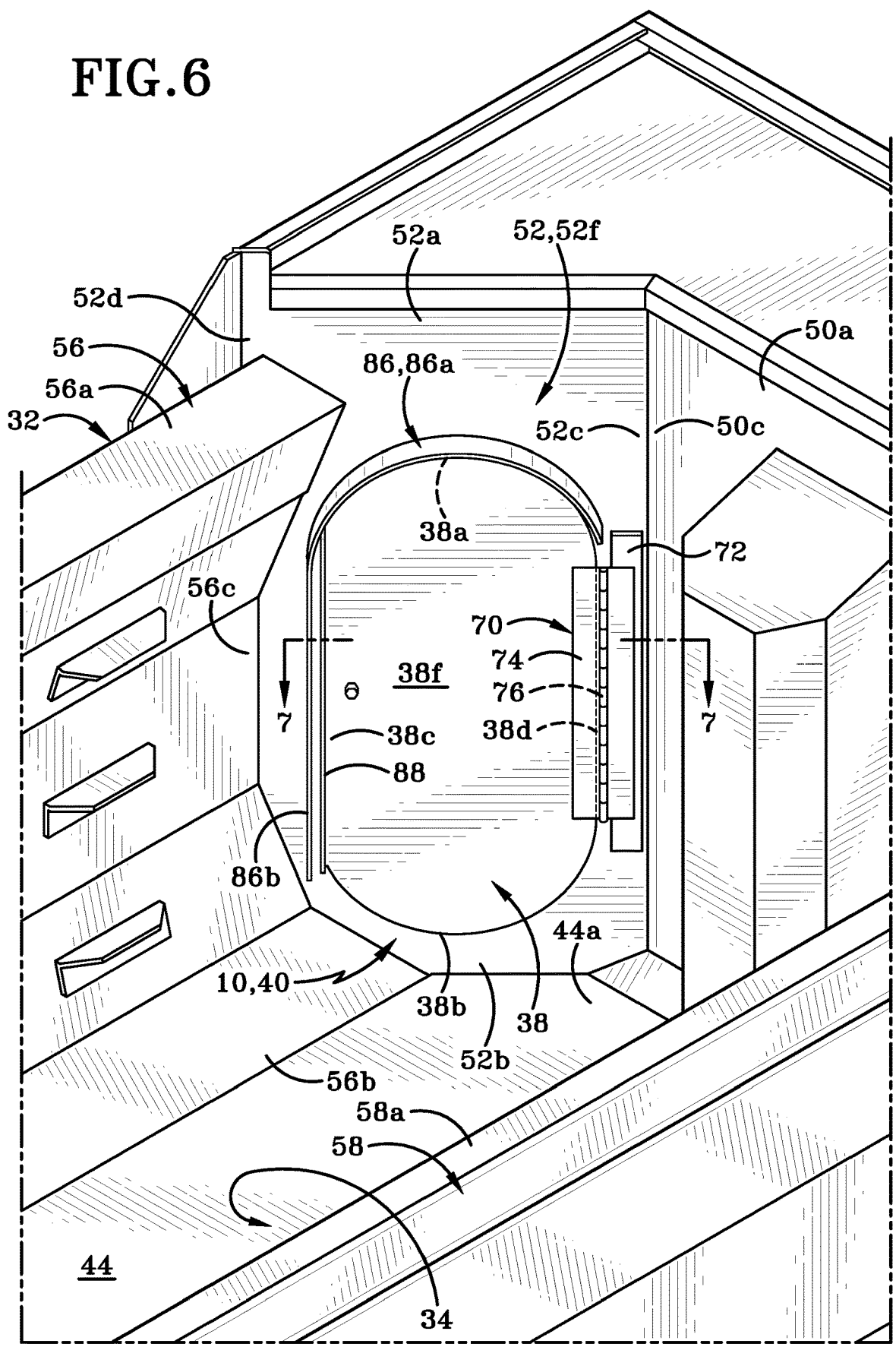
FIG. 6 is a rear perspective view of the door with the door in the closed position.

As shown in FIG. 6 and FIG. 8, dump body 18 may further include a flange 86 provided on the inner surface 52f of first wall 52 adjacent arcuate top end 38a of door 38 and first side 38c of door 38. Flange 86 extends for a distance inwardly into compartment 34. Flange 86 may be spaced a distance from top end 38a and first side 38c of door 36. Flange 86 may be aid in preventing contaminants, such as part of the load, from contacting seal 68. For example, and not meant as a limitation, flange 86 may be an elongated member having an arcuate section 86a and a straight section 86b and have a width suitable to prevent contaminants from contacting seal 68.

Figure 5:
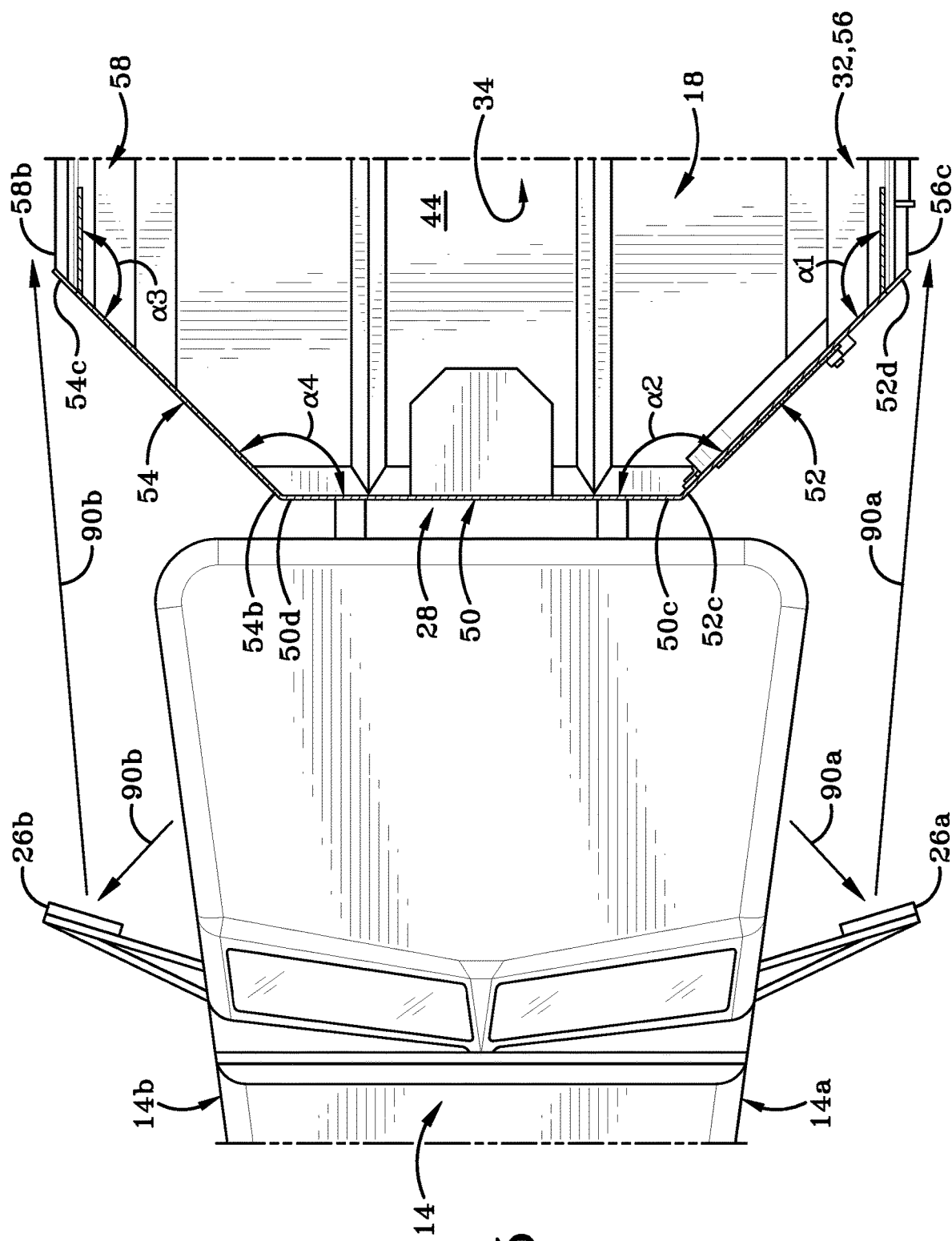
FIG. 5 is the same view as FIG. 3 with the addition of lines of sight passing adjacent first and second wall with parts removed for clarity.

As shown in FIG. 5, a first side-view mirror 26a may be provided on a first side 14a of cab 14 and second side-view mirror 26b may be provided on a second side 14b of cab 14. Solid arrows coming from first and second side view mirrors 26a, 26b depict a first line of sight 90a and a second line of sight 90b of an operator of the dump truck 12 as the operator looks into the first and second side-view mirrors 26a, 26b.

As shown in FIG. 5, first line of sight 90a is unobstructed by front wall 50 and passes adjacent first wall 52. Second line of sight 90b is unobstructed by front wall 50 and passes adjacent second wall 54.

Figure 4:
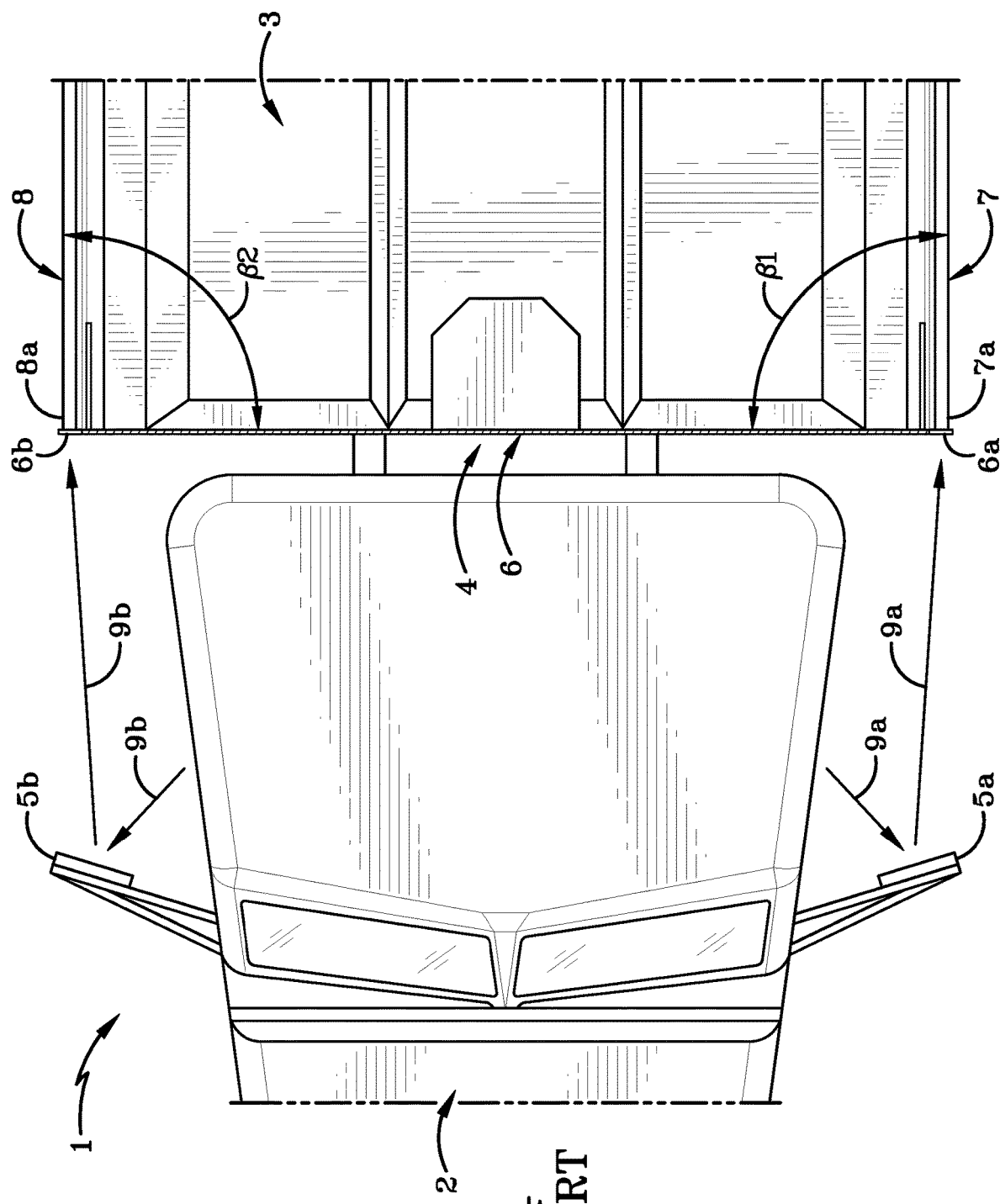
FIG. 4 is an enlarged top plan view of rear portion of a prior art cab and front portion of a prior art dump body showing lines of sight of the side-view mirrors.

A PRIOR ART dump truck 1 and prior art dump body 3 are shown in FIG. 4. Prior art dump truck 1 has a cab 2 operatively connected to the dump body 3 and the dump body 3 has a front end 4. Dump body 3 includes a front wall 6 having a first side 6a spaced apart from a second side 6b. Dump body further includes a first sidewall 7 having a first end 7a and a second sidewall 8 having a first end 8a. As shown in FIG. 4, first end 7a of first sidewall 7 connects with first end 6a of front wall 6 at a first angle β1. First end 8a of second sidewall 8 connects with second side 6b of front wall 6 at a second angle β2. Sidewalls 7, 8 of dump body 3 thus meet with front wall 6 in corner regions that are disposed at angles β1 and β2 and might be slightly rounded. These angles β1 and β2 are typically right angles. A first side-view mirror 5a is provided on a first side of cab 2 and a second side-view mirror 5b is provided on a second side of cab 2. Solid arrows coming from first and second side view mirrors 5a, 5b depict a first line of sight 9a and a second line of sight 9b of an operator of the dump truck 1 as the operator looks into the first and second side-view mirrors 5a, 5a.

When comparing first line of sight 90a and second line of sight 90b on dump body 18 with the prior art first line of sight 9a and the prior art second line of sight 9b of the prior art dump body 3 as depicted in FIG. 4; first line of sight 90a and second line of sight 90b of the dump body 18 provide a much improved and increased size viewing area over the prior art first line of sight 9a and second line of sight 9b. The prior art first and second lines of sight 9a, 9b are obstructed by the corner regions of the prior art dump body 3. In the presently disclosed dump body 18, the angled first and second walls 52, 54 tend not to obstruct the lines of sight for the driver. This increased visibility provided by the mitered first and second walls 52, 54 may tend to increase the safety of the driver of the vehicle.

As shown in FIG. 1 and FIG. 3, a step 94 and a platform 96 may be provided on dump body 18 in a region below door 38. Platform 96 may be generally triangular in shape so as not to extend outwardly beyond the front wall 50 and first sidewall 56 of the dump body 18. Step 94 may be provided to allow an operator to climb up onto platform 96 and down from platform 96 when an operator gets into and out of compartment 34 of dump body 18. As shown in FIG. 1, step 94 may be integrally formed as part of first fuel tank 24a. Platform 96 may be mounted to truck frame 16 in any suitable manner, such as by welding.

As shown in FIG. 1, dump truck apparatus 10 may further include a first handle 98a and a second handle 98b mounted on first side 14a of cab 14 adjacent the step 94. First handle 98a may aid the operator when the operator is climbing onto and off of the step 94. Second handle 98b may be mounted on first sidewall 56 of dump body 18. Second handle 98b may be configured to aid the operator when the operator moves into and out from compartment 34 of dump body 18. It is envisioned that first handle 98a and second handle 98b may be disposed in any suitable location to aid the operator when entering and exiting the compartment 34.

In operation, and with reference to FIG. 1-FIG. 3, and FIG. 5-FIG. 8, dump body 18 is illustrated as having a first and second wall, 52, 54 respectively. Door 38 is illustrated as being provided with seal 68 on first wall 52 of dump body 18. Handle assembly 78 may be manipulated to a disengaged position to open door 38. Once door 38 is open position, an operator may use step 94 to climb onto platform 96. Once the operator is on platform 96, the operator may step through opening 55 into compartment 34 of dump body 18. When the operator decides to leave the compartment 34, the operator steps down onto the platform 96 and down the step 94 onto the ground surface 22.

Further, and with reference to FIG. 5, the operator may look into first side-view mirror 26a or second side-view mirror 26b. If the operator looks into first side-view mirror 26a, the operator has a first line of sight 90a to see vehicles or objects behind the dump body 18. If operator looks into second side-view mirror 26b, the operator has a second line of sight 90b to see objects and vehicles behind dump body 18. As shown in FIG. 5, first line of sight 90a tends to be unobstructed by front wall 50 and passes by first wall 52. As shown in FIG. 5, second line of sight 90b tends to be unobstructed by front wall 50 and passes by second wall 54.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. For example, and not meant as a limitation, while door 38 has been described as being mounted in first wall 52, it is understood that door may be mounted in any suitable location on dump body 18.

More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A dump body comprising:
   an exterior wall including a bottom wall, a front wall, a pair of opposed sidewalls, and a first wall extending between the front wall and one of the pair of sidewalls at an obtuse angle relative to the one of the pair of sidewalls;
   a top end of the first wall;
   a bottom end of the first wall;
   a first side of the first wall;
   a second side of the first wall;
   a compartment bounded and defined by the exterior wall and adapted to carry a load;
   an opening defined between the top end, the bottom end, the first side, and the second side of the first wall; wherein the opening is in communication with the compartment; and
   a door that is movable between a closed position and an open position; wherein when the door is in the open position, the compartment is accessible through the opening.

2. The dump body of claim 1, wherein the opening defined in the first wall is sized to receive a person therethrough.

3. The dump body of claim 1, wherein the obtuse angle is from about 115 degrees up to about 155 degrees.

4. The dump body of claim 1, further comprising:
   an edge defined by the first wall that bounds and defines the opening; and
   a seal that circumscribes the edge and contacts the door when the door is in the closed position.

5. A dump body comprising:
   an exterior wall including a bottom wall, a front wall, a pair of opposed sidewalls, and a first wall extending between the front wall and one of the pair of sidewalls;
   a compartment bounded and defined by the exterior wall and adapted to carry a load;
   an opening defined in the first wall; wherein the opening is in communication with the compartment; and
   a door including an outer surface, an inner surface, an arcuate top end, an arcuate bottom end, a first side extending between the arcuate top end and the arcuate bottom end, and a second side extending between the arcuate top end and the arcuate bottom end; wherein the door is movable between a closed position and an open position; and wherein when the door is in the open position, the compartment is accessible through the opening.

6. The dump body of claim 5, further comprising:
   a hinge assembly operatively engaging the door to the first wall.

7. The dump body of claim 6, further comprising:
   an inner surface of the first wall; wherein the hinge assembly is mounted on the inner surface of the first wall.

8. The dump body of claim 1, further comprising:
   a handle assembly operatively engaged with the door and the first wall.

9. The dump body of claim 8, further comprising: a handle of the handle assembly; and an outer surface of the door; wherein the handle is mounted only on the outer surface of the door.

10. The dump body of claim 1, further comprising:
a top end of the door;
an inner surface of the first wall; and
a flange mounted on the inner surface of the first wall adjacent the top end of the door; wherein the flange extends inwardly for a distance into the compartment.

11. The dump body of claim 1, further comprising:
an inner surface of the door; and
a door flange operably engaged with the inner surface of the door; wherein the door flange extends inwardly for a distance into the compartment.

12. The dump body of claim 1, further comprising:
a front end of the dump body; and
a towing vehicle operatively engaged with the dump body and positioned in front of the front end of the dump body.

13. The dump body of claim 1, further comprising:
a front end of the dump body;
a rear end of the dump body; and
a lifting assembly operatively engaged with the front end of the dump body; wherein the lifting assembly is movable between a first position and a second position; wherein the front end of the dump body is raised at angle relative to the rear end of the dump body when the lifting assembly is in the first position; and wherein the front end of the dump body is horizontally aligned with the rear end of the dump body when the lifting assembly is in the second position.

14. The dump body of claim 1, further comprising:
at least one step operably engaged with the first wall; wherein the at least one step is provided a distance below the opening.

15. A dump body comprising:
an exterior wall including a bottom wall, a front wall, a pair of opposed sidewalls, and a first wall extending between the front wall and one of the pair of sidewalls at an obtuse angle relative to the one of the pair of sidewalls;
a compartment bounded and defined by the exterior wall and adapted to carry a load;
a door opening in communication with the compartment;
a door operably engaged with the first wall for selectively allowing access to the door opening; and
a hinge assembly operably engaging the door to the first wall; wherein the hinge assembly defines a vertically extending pivot axis.

16. The dump body of claim 15, wherein the pivot axis is provided within the compartment.

17. The dump body of claim 15, further comprising:
an inner surface of the first wall; wherein the hinge assembly is operably engaged with the inner surface of the first wall.

18. The dump body of claim 15, further comprising:
an inner surface of the door, wherein the hinge assembly is operably engaged with the inner surface of the door.

19. The dump body of claim 15, further comprising:
an open position of the door; and
a closed position of the door; wherein when the door moves from the closed position to the open position, the door moves entirely within the compartment.

20. The dump body of claim 15, further comprising:
a platform operably engaged with the first wall.

\* \* \* \* \*